(12) United States Patent
Mashiah

(10) Patent No.: US 12,393,662 B1
(45) Date of Patent: Aug. 19, 2025

(54) METHOD FOR NOTIFYING A USER UPON ACCESS OF AN IMPOSTER WEBSITE

(71) Applicant: MEMCYCO LTD, Ramat Gan (IL)

(72) Inventor: Eliyahu Mashiah, Raanana (IL)

(73) Assignee: MEMCYCO LTD, Ramat Gan (IL)

( * ) Notice: Subject to any disclaimer, the term of this patent is extended or adjusted under 35 U.S.C. 154(b) by 355 days.

(21) Appl. No.: 17/978,018

(22) Filed: Oct. 31, 2022

(51) Int. Cl.
*G06F 21/33* (2013.01)

(52) U.S. Cl.
CPC .................................... *G06F 21/33* (2013.01)

(58) Field of Classification Search
CPC ........................................................ G06F 21/33
See application file for complete search history.

(56) References Cited

U.S. PATENT DOCUMENTS

| | | | |
|---|---|---|---|
| 8,843,516 B2 | 9/2014 | Leong et al. | |
| 8,843,749 B2 | 9/2014 | Sauve et al. | |
| 8,887,245 B1 | 11/2014 | Wiltzius et al. | |
| 8,984,604 B2 * | 3/2015 | Begley | H04L 67/02 726/7 |
| 9,747,426 B2 | 8/2017 | Cohen et al. | |
| 10,397,243 B2 * | 8/2019 | Johns | H04L 63/1408 |
| 10,511,630 B1 * | 12/2019 | Weiss | H04L 63/20 |
| 10,664,332 B2 * | 5/2020 | Kohlmeier | G06F 9/548 |
| 10,999,322 B1 * | 5/2021 | Yuan | G06F 16/583 |
| 11,044,233 B2 * | 6/2021 | Martz | H04L 63/101 |
| 11,575,708 B2 * | 2/2023 | Devane | H04L 63/1416 |
| 11,810,117 B1 * | 11/2023 | Naamneh | H04L 63/145 |
| 2004/0078564 A1 * | 4/2004 | Abdulhayoglu | G06Q 20/3821 707/E17.107 |
| 2005/0268100 A1 * | 12/2005 | Gasparini | H04L 63/168 713/170 |
| 2006/0036746 A1 | 2/2006 | Davis | |
| 2006/0253446 A1 * | 11/2006 | Leong | H04L 63/1483 707/999.009 |
| 2006/0253458 A1 | 11/2006 | Dixon et al. | |
| 2006/0259767 A1 * | 11/2006 | Mansz | H04L 63/0823 713/168 |
| 2007/0061734 A1 | 3/2007 | Abdulhayoglu | |
| 2008/0028444 A1 | 1/2008 | Loesch et al. | |
| 2008/0034428 A1 | 2/2008 | Bejar et al. | |
| 2008/0046738 A1 | 2/2008 | Galloway et al. | |
| 2008/0127319 A1 | 5/2008 | Galloway et al. | |
| 2008/0141342 A1 * | 6/2008 | Curnyn | H04L 63/1441 726/3 |
| 2008/0168546 A1 | 7/2008 | Almeida | |
| 2008/0313732 A1 | 12/2008 | Pierce | |
| 2009/0037976 A1 | 2/2009 | Teo et al. | |
| 2009/0077637 A1 | 3/2009 | Santos et al. | |
| 2010/0031022 A1 * | 2/2010 | Kramer | H04L 63/1483 726/3 |
| 2010/0043058 A1 | 2/2010 | Sanders et al. | |
| 2010/0275024 A1 | 10/2010 | Abdulhayoglu | |
| 2011/0072262 A1 | 3/2011 | Amir et al. | |
| 2011/0277024 A1 | 11/2011 | Begley et al. | |

(Continued)

*Primary Examiner* — Darren B Schwartz
(74) *Attorney, Agent, or Firm* — Merchant & Gould P.C.

(57) ABSTRACT

A proof of authenticity of a website presentation, including: a presentation being retrievable from the local storage of the web browser, wherein the presentation is presented together with the main presentation retrieved from the website, thereby said presentation proves authenticity of the main presentation with said first website (10B).

4 Claims, 4 Drawing Sheets

(56) References Cited

U.S. PATENT DOCUMENTS

| | | | |
|---|---|---|---|
| 2013/0086677 A1* | 4/2013 | Ma | H04L 63/1483 |
| | | | 726/22 |
| 2014/0181931 A1 | 6/2014 | Bokarius et al. | |
| 2014/0325586 A1* | 10/2014 | Halliday | H04W 12/30 |
| | | | 726/1 |
| 2015/0074390 A1 | 3/2015 | Stoback et al. | |
| 2015/0195281 A1* | 7/2015 | Venkataramu | H04L 63/0884 |
| | | | 726/3 |
| 2017/0053105 A1 | 2/2017 | Curzi et al. | |
| 2017/0063841 A1 | 3/2017 | Candelore | |
| 2017/0346851 A1 | 11/2017 | Drake | |
| 2018/0063190 A1* | 3/2018 | Wright | H04L 63/1425 |
| 2019/0238588 A1* | 8/2019 | Sites | H04L 63/1483 |
| 2020/0099716 A1 | 3/2020 | Sjouwerman et al. | |
| 2020/0228551 A1* | 7/2020 | Dalal | H04L 63/1425 |
| 2020/0287935 A1 | 9/2020 | Richards et al. | |
| 2020/0304540 A1* | 9/2020 | Chang | H04L 61/4511 |
| 2021/0185033 A1 | 6/2021 | Albisu et al. | |
| 2022/0092168 A1* | 3/2022 | Brown | H04L 63/126 |
| 2022/0182410 A1* | 6/2022 | Tupsamudre | H04L 63/1483 |
| 2022/0414204 A1* | 12/2022 | Hauser | G06F 9/44526 |

\* cited by examiner

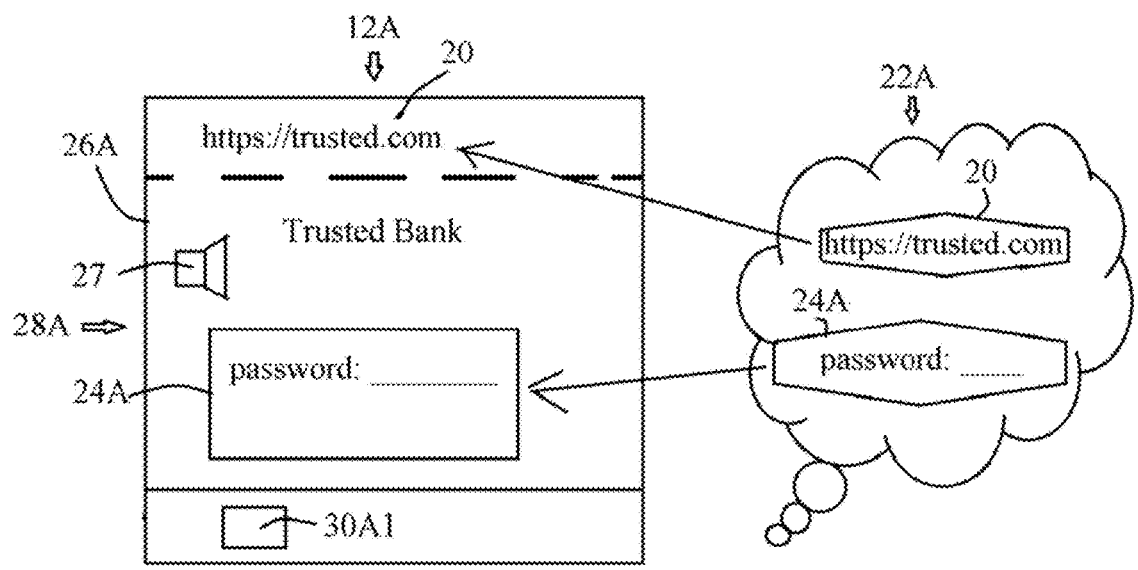
FIG 1 - PRIOR ART
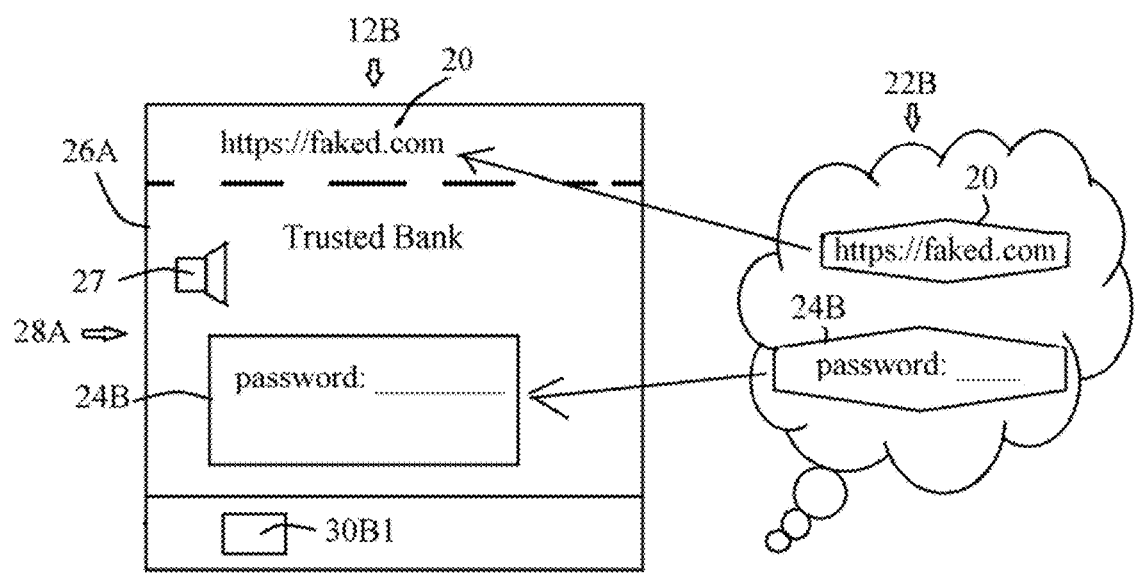
FIG 2 - PRIOR ART

METHOD FOR NOTIFYING A USER UPON ACCESS OF AN IMPOSTER WEBSITE

CROSS REFERENCE TO RELATED APPLICATIONS

This application claims priority to Israel application number 287705, filed Oct. 31, 2021. The contents of which is incorporated by reference in its entirety.

TECHNICAL FIELD

The invention relates to the field of brand impersonation through website cloning/spoofing/or otherwise faking, mostly used for phishing and avoidance thereof.

BACKGROUND

FIG. 1 depicts an example of a prior art trusted website and its presentation on the screen.

A web address 20 of a prior art trusted website 22A, e.g., https://trusted.com, runs a JavaScript program 30A1 running a web browser 28A on the user's computer.

A prior art website presentation 12A of trusted website 22A presented on a screen 26A of web browser 28A of the user's computer, presents web address 20 of trusted website 22A, being according to the example https://trusted.com.

Website presentation 12A of prior art trusted website 22A further presents trusted content 24A, such as a login screen requesting the user to provide user and password combination to login. The site https://trusted.com, also presents the last-login information showing the user when was the last time he logged-in to the site. This gives the user the confidence that he is indeed working with the true trusted site, assuming that a fake site could not have guessed the last-login date and time.

The user's computer displays the web address (URL) of the page currently viewed at the top address-bar of said user's computer. Examining the web address by the user is the current measurement to determine whether the page indeed belongs to the genuine website.

FIG. 2 depicts a fraudulent website and its presentation on the screen.

A web address 20 of a fraudulent forgery website 22B of a server somewhere, example given, https://faked.com, runs a JavaScript 30B1, on web browser 28A of the user's computer.

The website presentation 12B of fraudulent website 22B includes web address 20 of the fraudulent website 22B, e.g., https://faked.com being different. Website presentation 12B of fraudulent website 22B may further include the exact same content as the genuine site including the last login date and time, and content 24B.

Website presentation 12B of fraudulent website 22B may look equal to the prior art trusted presentation 12A except for a change in the web address 20, being "faked" in the example. Thus, the prior art proof of authenticity constitutes the website address presented at the top of the page.

The term "phishing" refers herein to fishing information through the internet.

However, the website address is ineffective for the function of proving authenticity, and websites like fraudulent website 22B utilize the similarity for phishing content from the user, such as passwords and credit card details.

There is a long felt need to provide a solution to the above-mentioned and other problems of the prior art.

SUMMARY

A proof of authenticity of a website presentation, including:
a presentation being retrievable from the local storage of the web browser,
wherein the presentation is presented together with the main presentation retrieved from the website.

BRIEF DESCRIPTION OF THE DRAWINGS

Embodiments, features, and aspects of the invention are described herein in conjunction with the following drawings:

FIG. 1 depicts an example of a prior art trusted website and its presentation on the screen.

FIG. 2 depicts a fraudulent website and its presentation on the screen.

The drawings are not necessarily drawn to scale.

DETAILED DESCRIPTION

The invention will be understood from the following detailed description of embodiments of the invention, which are meant to be descriptive and not limiting. For the sake of brevity, some well-known features are not described in detail.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

Security printing deals with physical printing of proof of authenticity added to the main content of printed items such as currency bills, banknotes, cheques, passports, etc. The printed proof of authenticity disables forgery thereof.

Similar to the security physical printing, a trusted website according to one embodiment of the invention includes a proof of authenticity added to the main content, being configured to avoid forgery.

Figure 3:
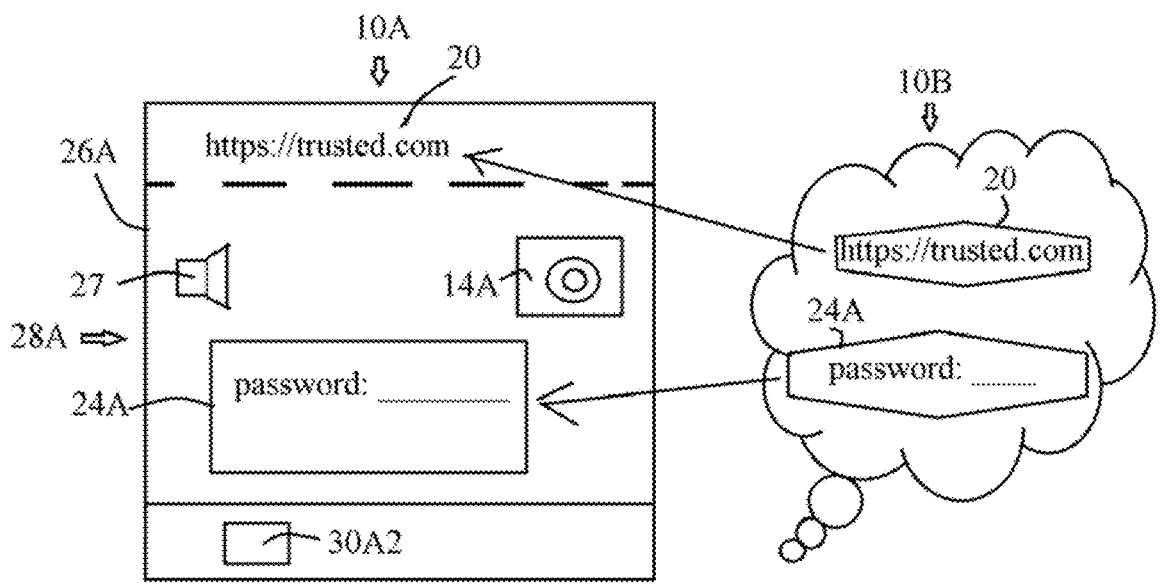
FIG. 3 depicts a trusted website according to one embodiment of the invention, applying the example of the prior art trusted website of FIG. 1.

FIG. 3 depicts a trusted website according to one embodiment of the invention, applying the example of the prior art trusted website of FIG. 1.

Web address/URL domain enumerated 20 of an exemplary trusted website 10B, being according to the example https://trusted.com, runs a JavaScript program 30A2 on web browser 28A of the user's computer.

A visual and audible element of website presentation 10A of trusted website 10B according to one embodiment of the invention, presented on screen 26A and loudspeaker 27, presents web address 20, being https://trusted.com according to the example. Website presentation 10A of trusted website 22A further includes trusted content 24A retrieved from trusted website 10B, being the source of the content.

Trusted content 24A may include a login screen with a user interface allowing the user to trustily provide the user's user and password combination to trusted website 10B.

Website presentation 10A of trusted website 10B provides, further to prior art trusted presentation 12A of prior art trusted website 22A of FIG. 1, includes a visual and/or audible element presentation 14A which may include an animation, such as two circles, functioning as an identification that content 24A of website presentation 10A indeed is the content of trusted genuine website 10B.

Figure 4:
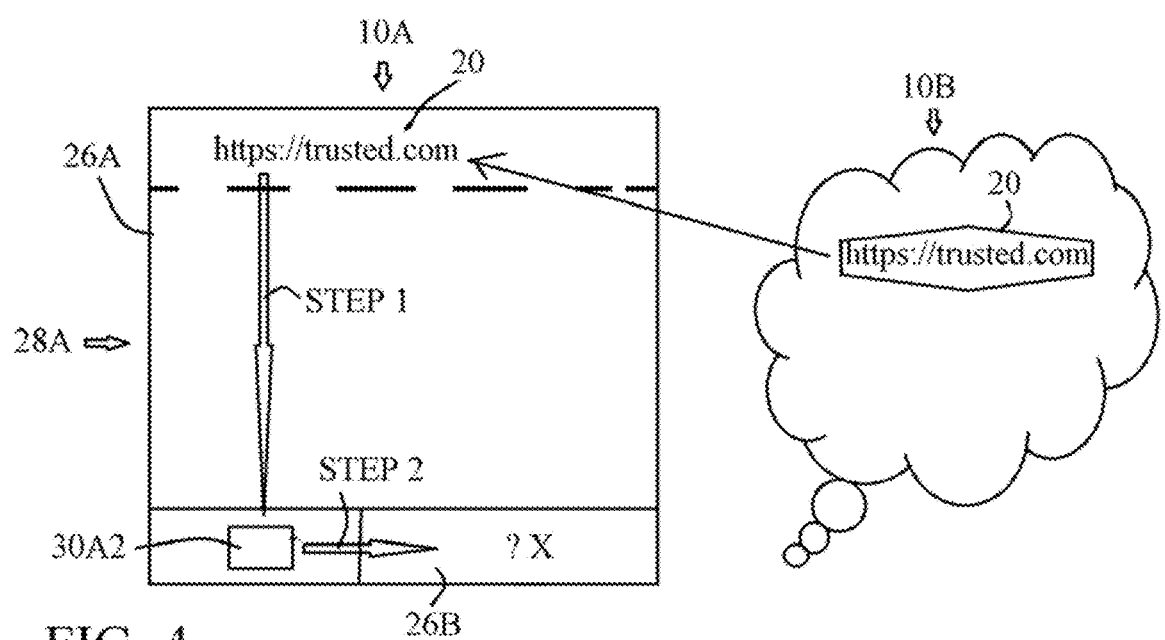
FIG. 4 depicts the first and second steps of running the web address of the trusted website of FIG. 3.

FIG. 4 depicts the first and second steps of running the web address of the trusted website of FIG. 3 for obtaining the identification of FIG. 3.

At the first step, being upon accessing web address 20 of trusted website 10B, being according to the example https://trusted.com, JavaScript program 30A2 of trusted website 10B run on web browser 28A, and presents content 24A on screen 26A.

The term "local storage" refers herein to any memory, disc, server, cloud, etc., being accessible to web browser 28A of the user's computer.

The above mentioned disc may as well be a disc of a server of a website. However, it is not the website from which the content was initially downloaded.

The local storage preferably constitutes a Domain Associated Storage, being a data storage and source that is associated with a given network domain, accessible only to client-code of that domain being JavaScript program 30A2. Example of such Domain Associated Storage is the local-storage feature of modern browsers or cloud implementations of such functionality.

At the second step, JavaScript program 30A2 looks in the local storage 26B of web browser 28A whether an identifying presentation, such as a file, is stored.

At the first time the user accesses web address 20 of trusted website 10B, local storage 26B does not yet contain an identifying presentation.

Figure 5:
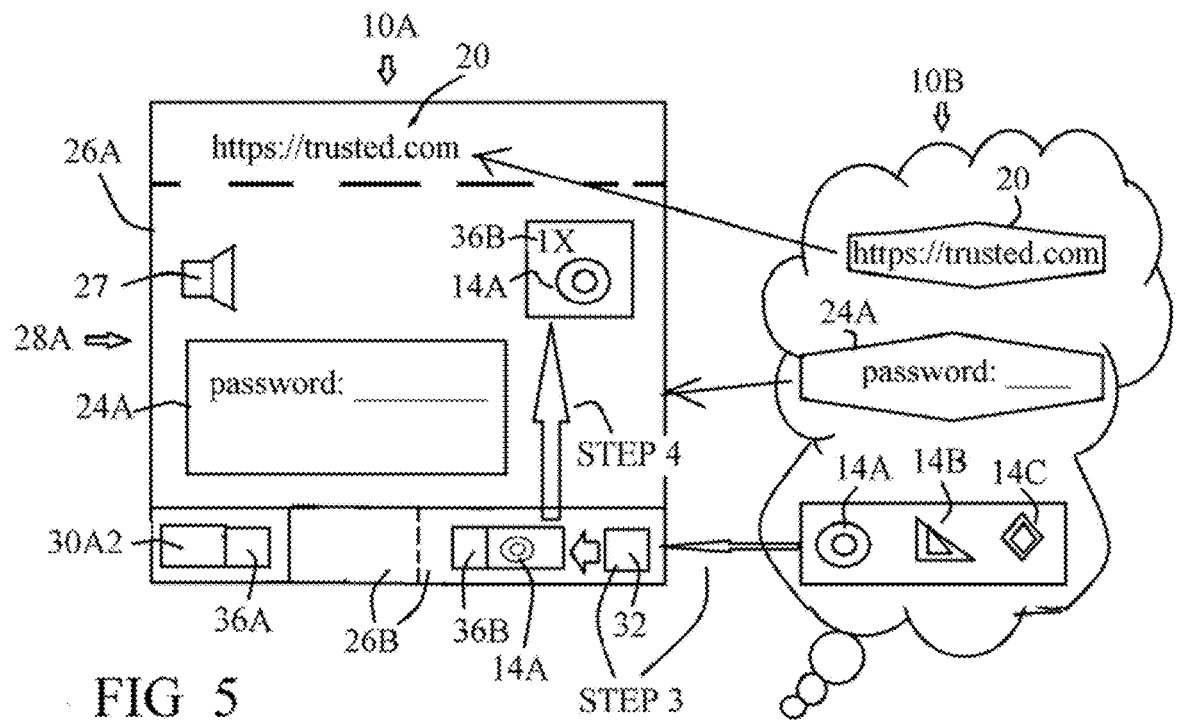
FIG. 5 depicts the third step of running the web address of the trusted website of FIG. 3.

FIG. 5 depicts the third step of running the web address of the trusted website of FIG. 3.

At the case local storage 26B does not contain an identifying presentation, then at the third step, JavaScript program 30A2 downloads the identifying presentation from trusted website 10B, as described following.

The server of trusted website 10B includes a plurality of available presentations, namely 14A, 14B, 14C, etc. At the third step, JavaScript program 30A2 is programmed to download only one presentation, say 14A only, into local storage 26B of web browser 28A, being selected (32) from those presentations 14A, 14B, 14C, etc.

Selection 32 of presentation 14A may be random or manual selection by the user request. The selection of presentation 14A may as well be applied by secret of selection.

Thus, the downloading and selection of the presentation running on user' computer 28A and writing by the user of the presentation is unpredictable to any other web browser, such as to 28B (of FIG. 7), thus presentation 14A functions as an identifying presentation.

Program 30A2 may further add a code 36A to identifying presentation 14A. Each of code 36A and of presentation 14A may be written to local storage 26B by the user via the user interface of program 30A2. For example, the user may draw a picture, or write a passcode, and may record a voice, and may process any of the above.

Program 30A2 copies code 36A if defined as 36B, to local storage 26B attached to identifying presentation 14A.

At the fourth step, being after storing identifying presentation 14A into local storage 26B at the first running, JavaScript program 30A2 retrieves identifying presentation 14A from local storage 26B, being the retrieval source, and presents identifying presentation 14A together with code 36B if present on screen 26A of web browser 28A.

In the example of FIG. 5, code 36B as presented is "1X" being an addition to presentation 14A. Code 36B may be type of the display of presentation 14A, such as coloring presentation 14B to green or three-dimensional or rounded, such that the green color constitutes the secret code.

That is, the fourth step being after once retrieving identifying presentation does not retrieve identifying presentation 14A again from website 10B.

That is, the above mentioned local storage being a disc of a website, excludes website 10B, from which identifying presentation 14A has been already retrieved.

Figure 6:
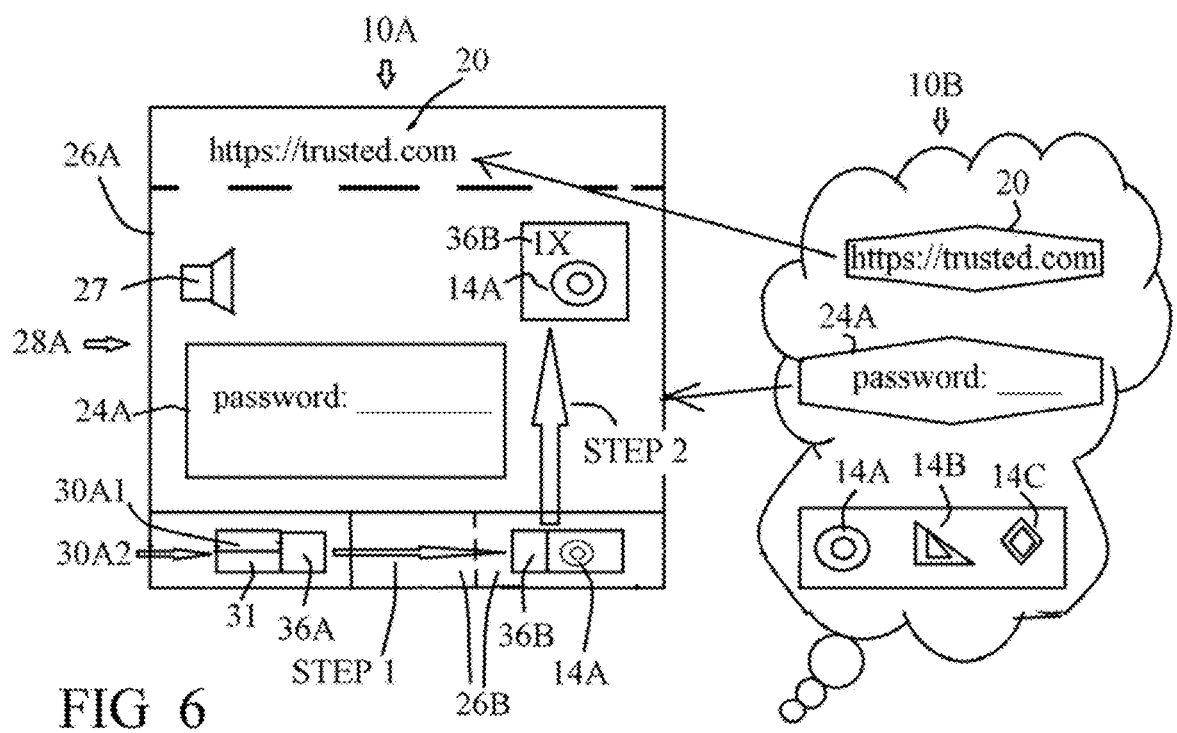
FIG. 6 depicts the second and next openings of the web address of the trusted website of FIG. 3.

FIG. 6 depicts the second and next openings of the web address of the trusted website of FIG. 3.

At the second and at any further time the user's computer 28A runs JavaScript program 30A2, being at the second and other times web browser 28A of the user's computer accesses website 20, the following two steps apply.

At the first step JavaScript program 30A2 finds identifying presentation 14A in local storage 26B, and at the second step presents identifying presentation 14A, which may include code 36B, on screen 26A.

Presentation 10A of website 10B utilizes protocol HTTPS (Hypertext Transfer Protocol Secure), which ensures a different local storage to each web address/URL domain. This is a basic feature in most modern web-browsers, in contrast to HTTP (Hypertext Transfer Protocol).

The term "plugin" refers herein to software component adding a feature to an existing computer system.

JavaScript program 30A2 may include prior art program 30A1 plugged to a software component 31 being a plugin adding the proof of authenticity to prior art program 30A1.

Namely, JavaScript program 30A1 presents prior art trusted website 22A of FIG. 1 presenting trusted content 24A only; and plugin 31 presents identifying presentation 14A proving the authenticity of content 24A to the user, and retrieves identifying presentation 14A from local storage 26B, and downloads identifying presentation 14A to local storage 26B.

Figure 7:
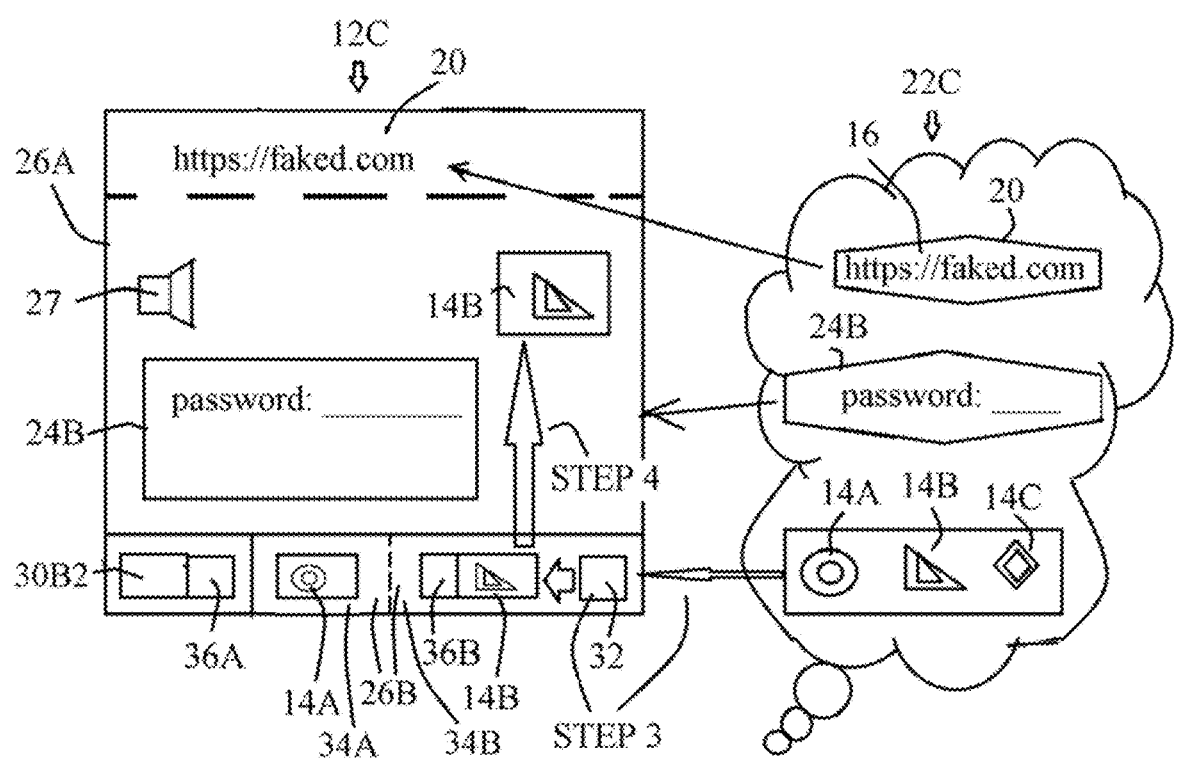
FIG. 7 depicts a fraudulent website attempting to phish information from the web browser of the user's computer.

FIG. 7 depicts a fraudulent website attempting to provide wrong content to the web browser of the user's computer.

Suppose a fraudulent website 22C, which may be accessed by a fraudulent link https://faked.com, runs a JavaScript program 30B2, being similar to JavaScript program 30A2 of trusted website 10B, on web browser 28A of the user's computer, and suppose fraudulent website 22C as well includes the presentations of trusted website 10B, namely 14A, 14B, 14C, etc.; and JavaScript program 30B2 downloads only one presentation therefrom.

However, HTTPS provides the web browser of website 22C does not allow access to local storage 26B of web browser 28A.

JavaScript program 30B2 of fraudulent website 22C probably will select identifying presentation 14B rather than 14A familiar to the user, due to the unpredictable selection described above, and thus will present identifying presentation 14B on screen 26A at the fourth step.

Identifying presentation 14B being unfamiliar to the user being familiar with identifying presentation 14A, indicates unintended access to fraudulent website 22C, thus alerts the user without actually alerting Thus, identifying presentation 14A functions as a passcode/proof of authenticity (Poa) of content 24A.

Even though identifying presentation 14A, familiar to the user, was stored in local storage 26B by trusted website 10B, JavaScript program 30B2 of fraudulent website 22C cannot access identifying presentation 14A, since JavaScript program 30B2 is not run by the website having web address 20 of trusted website 10B, since the local-store is tightly associated with the original domain by the web browser.

As explained in FIG. 6, only JavaScript program 30A2 finds identifying presentation 14A and can write code 36B, whereas JavaScript program 30B2 cannot find identifying presentation 14A, since Protocol HTTPS ensures its separate local storage to that web address/URL domain.

In the figures and/or description herein, the following reference numerals (Reference Signs List) have been mentioned:

- numeral 10B denotes the trusted website according to one embodiment of the invention;
- 10A: presentation of trusted website 10B;
- 12A: prior art website presentation;
- 12B: website presentation of fraudulent website 22B;
- 12C: website presentation of fraudulent website 22C;
- 14A,14B,14C: available visual and/or audible presentation, each may constitute an identification that website presentation 10A presents the content of trusted website 10B;
- 20: web address;
- 22A: prior art trusted website 22A;
- 22B: fraudulent website attacking prior art trusted website 22A;
- 22C: fraudulent website attacking inventive trusted website 10B;
- 24A: content including user interface, presented by trusted website 10B;
- 24B: wrong content including user interface, presented by fraudulent websites 22B and 22C;
- 26A: screen including loudspeaker 27, of computer;
- 26B: local storage of the web browser;
- 27: loudspeaker of computer;
- 28A: user's computer running on the user's computer;
- 30A1: computer program such as JavaScript run by prior art trusted website 22A;
- 30B1: computer program such as JavaScript run by fraudulent website 22B for attacking prior art trusted website 22A;
- 30A2: computer program such as JavaScript run by inventive trusted website 10B;
- 30B2: computer program such as JavaScript run by fraudulent website 22C for attacking trusted website 10B;
- 31: software component being a plugin; computer program 30A2 may be a combination of computer program 30A1 and software component 31;
- 32: random selection;
- 36A: code added by computer program 30A2 to identifying presentation 14A of inventive trusted website 10B;
- 36B: code attached to identification presentation 14A for being presented.

According to another embodiment of the disclosed technique, for each domain accessed by the local machine, a domain unique verification record (e.g., database record, file) is generated locally by the local machine and stored locally in the local machine, in a location exclusively associated with that domain. This domain unique verification record is generated for every domain and is unique therefore. This domain unique verification record is generated for every domain accessed by the local machine for the first time. When the local machine accesses that domain at a later time, since the domain unique verification record already exists for that domain, the local machine is not required to generate a new one. Instead, the local machine can simply access that domain's unique verification record associated with that re-accessed domain.

Each domain unique verification record has a domain unique visual representation associated therewith. The user has access to the domain unique visual representation associated with each one of the domain unique verification records and may change it at will, so that the user may better and easier recognize that domain unique visual representation the next time it is presented thereto.

When a phishing domain is accessed for the first time (e.g., via a link provided to the user), the local machine generates a phishing domain unique verification record for that phishing domain. The local machine further associates a new phishing domain unique visual representation with that phishing domain unique verification record. Thereafter, the local machine presents that phishing domain as a unique visual representation to the user. Since this phishing domain unique visual representation is highly unlikely to be recognized by the user as a domain unique visual representation that he is already aware of, the user shall have a strong indication that the fishing domain is not a genuine domain and he is likely to take appropriate actions accordingly.

According to a further aspect of the disclosed technique, the local machine does not involve the domain in the process of generating a domain unique verification record or in the process of associating a domain unique visual representation.

According to yet another aspect of the disclosed technique, the local machine may also store locally a criteria (e.g., indication, set of characters, set of characteristics) of authenticity for a previously authenticated domain (e.g., recognized as such by the user). When an imposter domain (e.g., phishing domain) is accessed for the first time (e.g., via a link provided to the user), the local machine generates a imposter domain unique verification record for that imposter domain which checks to see if it matches one or more verification characteristics which are associated exclusively with the genuine site (i.e., that the imposter site is attempting to resemble). If there is no match with the verification characteristic(s), the user and the owner of the genuine domain are notified that the imposter domain is not a genuine domain and the user is likely to take appropriate actions accordingly.

The foregoing description and illustrations of the embodiments of the invention have been presented for the purpose of illustration, and are not intended to be exhaustive or to limit the invention to the above description in any form.

Any term that has been defined above and used in the claims, should be interpreted according to this definition.

The reference numbers in the claims are not a part of the claims, but rather used for facilitating the reading thereof. These reference numbers should not be interpreted as limiting the claims in any form.

What is claimed is:

1. A method for notifying at least one of a user and an owner of an authentic website upon user access of an imposter website of said authentic website, said method comprising the steps of:
    for a previously authenticated website, storing at least one criteria locally on a computer of said user as a domain unique verification record for said previously authenticated website, said at least one criteria being associated exclusively with said previously authenticated website;
    upon first time access of said imposter website, generating locally on said computer of said user an imposter domain unique verification record;
    determining that said imposter domain unique verification record does not match at least one of said at least one criteria by comparing said domain unique verification record with said imposter domain unique verification record; and
    notifying at least one of said user and said owner that said user has accessed said imposter website when said imposter domain unique verification record does not match said at least one of said at least one criteria,
    wherein said at least one criteria is at least one of a visual element and an audible element associated exclusively with said previously authenticated website; and
    wherein said imposter domain unique verification record comprises at least one second criteria also stored locally on said computer of said user, said at least one second criteria being different than said at least one criteria of said domain unique verification record.

2. The method of claim 1, wherein said at least one criteria is selected from the list consisting of:
    an indication;
    a set of characters; and
    a set of characteristics.

3. The method according to claim 1, wherein said storing said at least one criteria locally on said computer comprises storing said at least one criteria on a local storage, said local storage being accessible to a web browser of said computer of said user.

4. The method according to claim 3, wherein said local storage is selected from the list consisting of:
    a memory;
    a disc;
    a server; and
    a cloud server.

* * * * *